(12) United States Patent
Mesly (10) Patent No.: US 7,255,261 B2
(45) Date of Patent: Aug. 14, 2007

(54) FOLDABLE STORAGE CONTAINER

(75) Inventor: Olivier Denys André Mesly, 3945 Renfrew Cr., Mississauga, Ontario (CA) L5L 4J6

(73) Assignee: Olivier Denys Andre Mesly, Sherbrooke (CA)

( * ) Notice: Subject to any disclaimer, the term of this patent is extended or adjusted under 35 U.S.C. 154(b) by 639 days.

(21) Appl. No.: 10/774,474

(22) Filed: Feb. 10, 2004

(65) Prior Publication Data

US 2004/0200890 A1   Oct. 14, 2004

Related U.S. Application Data

(60) Provisional application No. 60/462,330, filed on Apr. 14, 2003.

(51) Int. Cl.
  *B65D 5/36* (2006.01)
  *B65D 5/46* (2006.01)

(52) U.S. Cl. .................. 229/117.08; 119/168; 229/101; 229/117.14; 229/176

(58) Field of Classification Search ................ 229/101, 229/172, 117.01, 117.07, 117.08, 117.14, 229/174, 176, 122, 123; 119/165, 168
See application file for complete search history.

(56) References Cited

U.S. PATENT DOCUMENTS

| | | | | |
|---|---|---|---|---|
| 1,135,742 A | * | 4/1915 | Voris | 229/117.14 |
| 1,230,552 A | * | 6/1917 | Bain | 229/101 |
| 1,738,744 A | * | 12/1929 | Harrison | 229/117.07 |
| 1,983,689 A | * | 12/1934 | Bedell | 229/117.14 |
| 2,074,638 A | * | 3/1937 | Black | 229/117.14 |
| 3,010,635 A | * | 11/1961 | Sheldon-Williams | 229/123 |
| 3,154,052 A | * | 10/1964 | Sweeney | 119/168 |
| 3,170,618 A | | 2/1965 | Sweeney | |
| 3,478,949 A | * | 11/1969 | Richgels | 229/117.07 |
| 4,192,445 A | * | 3/1980 | Card | 229/174 |
| 4,501,226 A | | 2/1985 | Bienvenu et al. | |
| 4,548,160 A | | 10/1985 | Feitelson | |
| 4,628,863 A | | 12/1986 | Eichenauer | |
| 4,648,549 A | | 3/1987 | Trutna | |
| 4,791,883 A | | 12/1988 | Lehman et al. | |
| 4,813,376 A | | 3/1989 | Kaufman et al. | |
| 4,890,576 A | * | 1/1990 | James | 119/168 |
| 5,035,205 A | | 7/1991 | Schiller et al. | |

(Continued)

FOREIGN PATENT DOCUMENTS

CA     1244728     11/1988

(Continued)

*Primary Examiner*—Gary E. Elkins
(74) *Attorney, Agent, or Firm*—Bereskin & Parr (57) ABSTRACT

A storage container that is foldable between a first, second and third position, and having a generally planar base, a pair of opposing end panels, and a pair of opposing side panels. In the first position, the side panels and end panels are folded to form a generally planar shape. When formed into the second position, the end and side panels are folded generally perpendicular to the base to form an open container shape. In the third position, the base panels, side panels and end panels are folded to form a closed box shape. The base includes a bottom portion located between a pair of base panels. The end panels are foldably connected to the base panels. The side panels are foldably connected to the base and the end panels.

32 Claims, 12 Drawing Sheets

U.S. PATENT DOCUMENTS

| | | |
|---|---|---|
| 5,078,099 A | 1/1992 | Balson |
| 5,123,381 A | 6/1992 | Salmon |
| 5,144,914 A | 9/1992 | Giannakopoulos |
| 5,178,100 A | 1/1993 | Monk |
| 5,211,134 A | 5/1993 | Bolo, III |
| 5,249,550 A * | 10/1993 | Hines et al. ................. 119/168 |
| 5,251,573 A | 10/1993 | Bremley |
| 5,488,929 A | 2/1996 | Pierson et al. |
| 5,586,679 A * | 12/1996 | Thomas ................. 229/117.07 |
| 5,615,639 A | 4/1997 | Knight |
| 5,645,212 A * | 7/1997 | Potter ......................... 229/101 |
| 5,758,601 A | 6/1998 | Dickson |
| 5,765,504 A | 6/1998 | Evans et al. |
| 5,785,001 A | 7/1998 | Robinson |
| 5,845,601 A | 12/1998 | Robinson |
| 5,913,282 A | 6/1999 | Indes et al. |
| 6,155,479 A * | 12/2000 | Wellner et al. ........ 229/117.08 |
| 6,371,048 B1 | 4/2002 | Smith |
| 6,382,131 B1 * | 5/2002 | McGivern ................... 119/165 |
| 6,427,906 B2 | 8/2002 | Grueneberg |
| 6,523,714 B2 * | 2/2003 | Serbiak ....................... 221/45 |

FOREIGN PATENT DOCUMENTS

| | | |
|---|---|---|
| CA | 2130758 | 10/1993 |
| CA | 2348324 | 11/2001 |
| FR | 2602744 | 2/1988 |
| NL | 6908548 | 12/1970 |

* cited by examiner

FOLDABLE STORAGE CONTAINER

FIELD OF THE INVENTION

The present invention relates to storage containers, and in particular to foldable storage containers.

BACKGROUND OF THE INVENTION

Boxes or storage containers are commonly used to store a wide variety of household, medical and commercial materials. These materials may include unsanitary or hazardous wastes which, if disturbed when being disposed of, may cause environmental or health concerns.

Another use for storage containers is to store pet wastes. These pet wastes are typically mixed with an absorbent granular material. These pet litter containers must be regularly emptied to reduce the occurrence of odours and to combat the spread of bacteria and allergens. Emptying a litter container either requires the transfer of the granular material into a waste receptacle, or the removal of the waste particles.

Numerous storage containers have been developed to store and dispose of waste materials, such as pet wastes. Many of these storage containers are commercially available in a pre-formed, rigid box shape. These box-shaped containers can be cumbersome and costly to ship. Furthermore, such containers serve only as an inexpensive and disposable replacement of the litters trays. If used for prolonged periods of time without being replaced, these containers may deteriorate and fracture causing the waste material to be strewn about the household or workplace.

To prevent the release of waste materials, several storage containers which fold from a tray position to a closed box position are known. Unfortunately, many of these storage containers consist of hinged panels and channels that become obstructed by the waste material, thereby preventing the storage containers from being completely closed. To close these storage containers, a user may have to touch the waste material in order to remove the obstructions.

Accordingly, there is a need for an improved foldable storage container which allows for more convenient storage and disposal of waste materials.

SUMMARY OF THE INVENTION

The subject invention is directed to a storage container that is foldable between a first, second and third position. The storage container has a generally planar base, a pair of opposing end panels, and a pair of opposing side panels. The base includes a bottom portion located between a pair of base panels. In the first position, the side panels and end panels are folded to form a generally planar shape. When formed into the second position, the end and side panels are folded generally perpendicular to the base to form an open container shape. In the third position, the base panels, side panels and end panels are folded to form a closed box shape. The end panels are foldably connected to the base panels. The side panels are foldably connected to the base and the end panels.

The subject invention is also directed to a storage container comprising a generally planar base, a pair of opposing end panels, and a pair of opposing side panels. The base includes a bottom portion and a pair of base panels foldably connected to the bottom portion. The bottom portion is located between each of the pair of base panels. The pair of opposing end panels are foldably connected to the base panels. The pair of opposing side panels are foldably connected to the base and end panels. Each pair of side panels defines a channel therein. The channel slidably receives a tab at each end thereof. The tab is connected to the base panel and is adapted to position the side panel in a generally upright position when the end panels and base panels move between an open position and a closed position.

BRIEF DESCRIPTION OF THE DRAWINGS

For a better understanding of the present invention, and to show more clearly how it may be carried out in practice, reference will now be made, by way of example only, to the accompanying drawings, in which.

DETAILED DESCRIPTION OF THE PREFERRED EMBODIMENT

Figure 1:
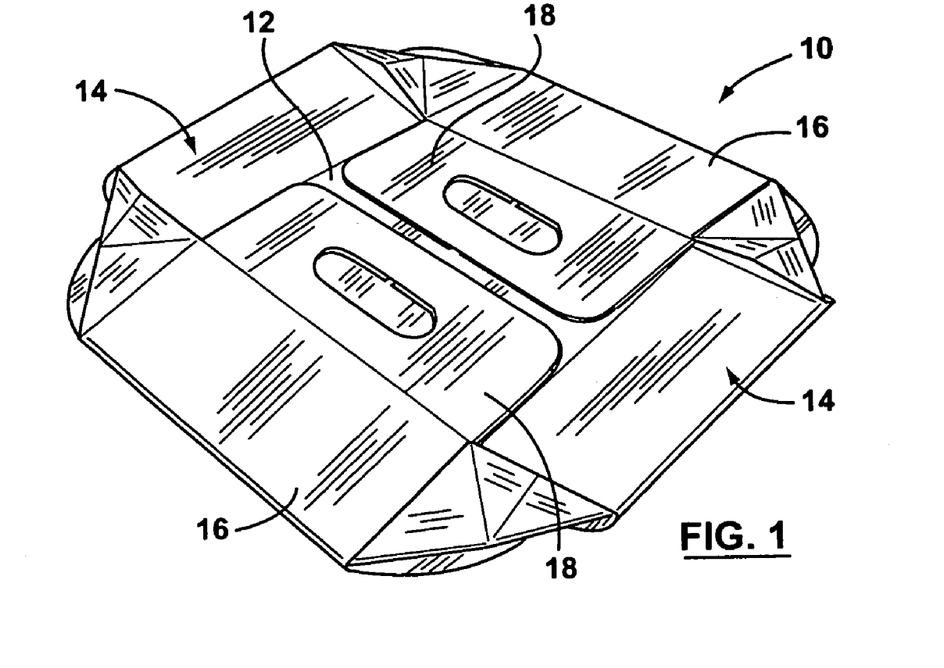
FIG. 1 is a perspective view showing a storage container according to a preferred embodiment of the present invention in a generally planar position.
Figure 2:
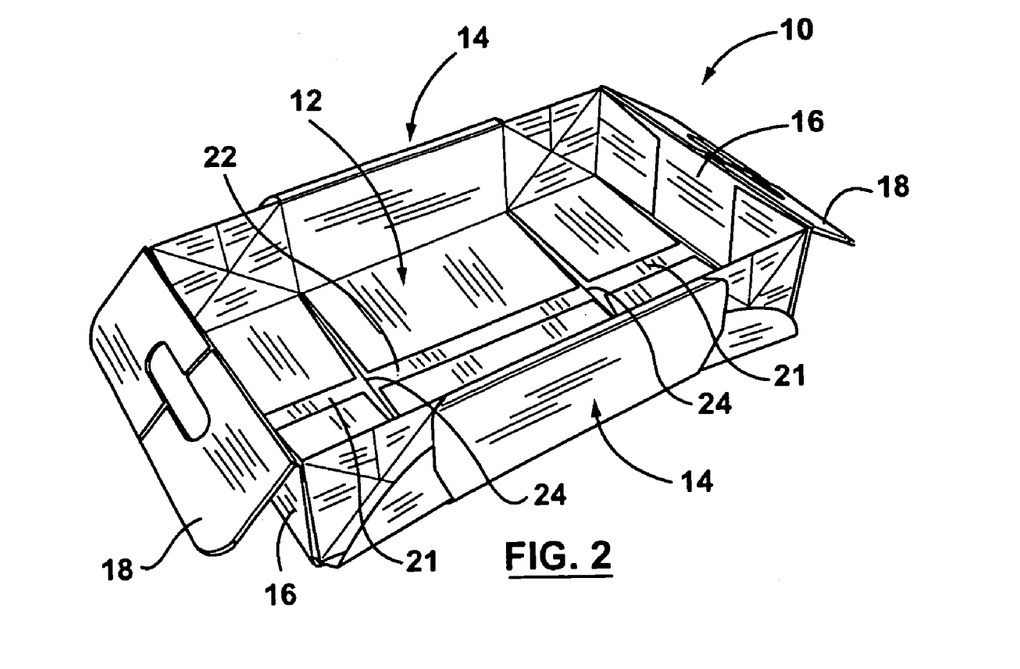
FIG. 2 is a perspective view of the storage container in an open container position.
Figure 3:
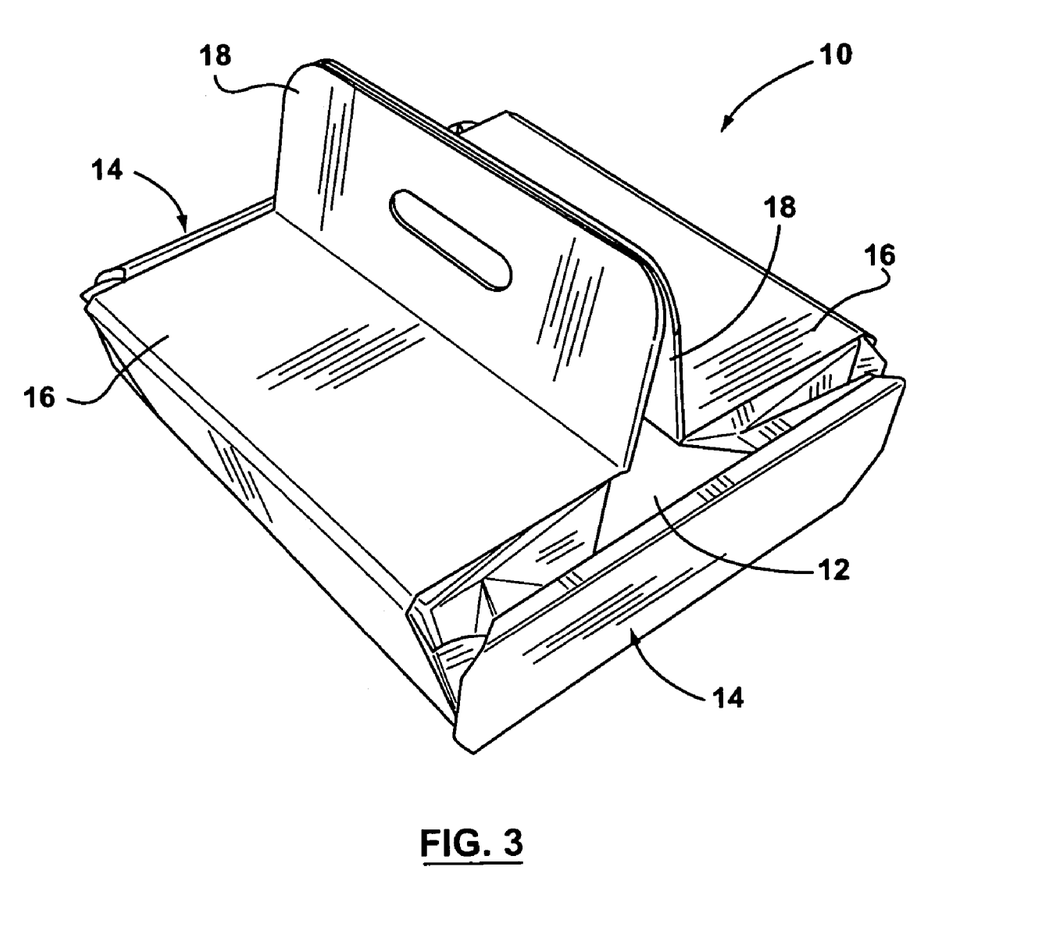
FIG. 3 is a perspective view of the storage container in a closed box position.

Reference is made to FIGS. 1, 2 and 3 which illustrate a storage container 10 made in accordance with a preferred embodiment of the present invention. The storage container 10 comprises a base 12, a pair of opposing side panels 14, and a pair of opposing end panels 16. The storage container 10 is foldable between a first, second and third positions, as shown in FIGS. 1, 2 and 3, respectively. The first position is also referred to as the "generally planar position", the second position is also referred to herein as the "open position", and the third position is referred to as the "closed position".

In the first position shown in FIG. 1, the storage container 10 has a generally planar shape that is particularly suitable for shipping and stacking purposes. When folded into the second or open position shown in FIG. 2, the side panels 14 and the end panels 16 of the storage container 10 are folded generally perpendicular to the base 12 to form an open container. In the third or closed position shown in FIG. 3, the base 12, side panels 14 and end panels 16 of the storage container 10 are folded to form a closed box, as described in detail below. The storage container 10 may include a pair of opposing handle panels 18 connected to the end panels 16 to facilitate the carrying of the container.

The storage container 10 may be used to store a wide variety of materials and tools, such as, for example, granular and flowable materials, saw dust, plaster, gardening and medical implements. In a preferred embodiment, the storage container 10 is used to store cat litter.

In a preferred embodiment of the present invention, the storage container 10 is made from a cardboard material, such as corrugated or non-corrugated cardboard. It will be understood by those skilled in the art that the storage container 10 may be made from any other suitable material such as, for example, plastic, paperboard, and multi-layered laminated paper. The storage container 10 may also have water resistant and anti-bacterial characteristics to prevent the leakage of moisture from the container and to limit contamination.

Figure 4:
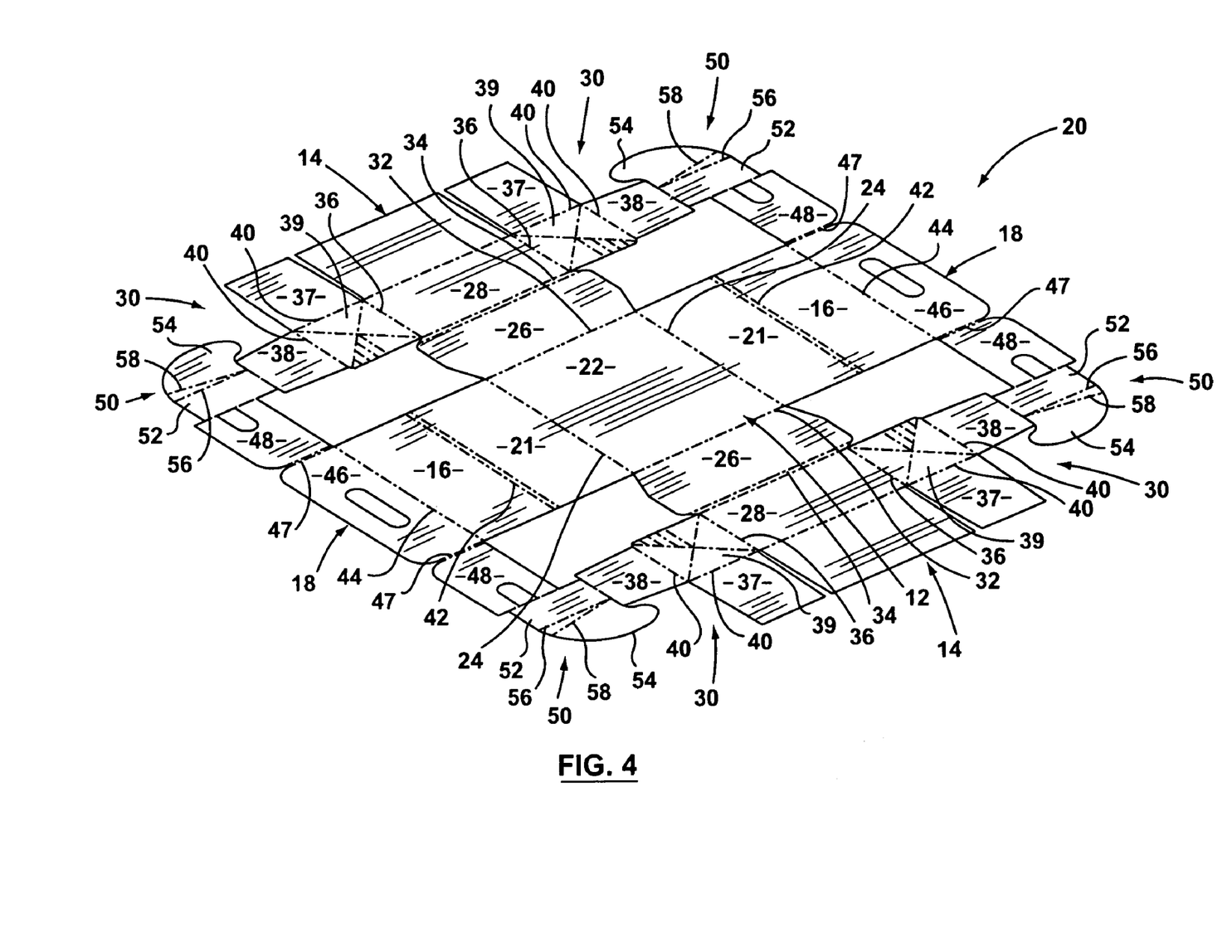
FIG. 4 is a perspective view of the blank used to make the storage container.

The storage container 10 is preferably formed from a cardboard blank 20 illustrated in FIG. 4. Referring to FIGS. 2 and 4, the base 12 of the storage container 10 forms a generally planar surface having a pair of base panels 21 and a bottom portion 22 located between each of the pair of base panels 21. The base panels 21 are foldably connected to the bottom portion 22 along a pair of centre fold lines 24 to define the generally rectangularly shaped base 12. As will be illustrated, the centre fold lines 24 enable the storage container 10 to be folded from the second position to the third position.

Referring to FIG. 4, each of the side panels 14 comprises an outer panel 26, an inner panel 28 and a pair of corner panels 30. Each outer panel 26 is foldably connected to the bottom portion 22 along a first side fold line 32. The first side fold lines 32 enable the storage container 10 to be folded from the first position to the second position. The inner panel 28 of each side panel 14 is foldably connected to the outer panel 26 along double fold line 34. The inner panel 28 is also foldably connected to the corner panels 30 along a pair of opposing fold edges 36. Each corner panel 30 includes a base flap 37 and an end flap 38 which are foldably connected to a pivot panel 39 along a flap fold line 40.

The end panels 16 are foldably connected to the base panels 21 along a pair of end fold lines 42. The end fold lines 42 enable the storage container 10 to be folded from the first position into the second position. The end panels 16 have an outer edge 44 which is foldably connected to the handle panels 18 to enable the handles to be pivoted for use when transporting the storage container 10.

The handle panels 18 may have various configurations and shapes to facilitate the carrying of the storage container 10. The handle panel 18 may include a main handle 46 and a pair of opposing handle reinforcing portions 48 foldably connected to the main handle 46 along handle edges 47. For applications involving the storage of lightweight materials, the handle panel 18 may consist of only the main handle 46. For the carriage of heavier materials, the handle panel 18 may comprise of two main handles 46 which are foldably connected to form a sturdy support for carrying the storage container 10.

Continuing to refer to FIG. 4, the storage container 10 further comprises four tabs 50 which are detachably connected to the blank 20. Each tab 50 has an attachment portion 52 and an insert portion 54 which assist in the folding of the storage container 10 from the first position to the second position, as described in detail below. The attachment portion 52 is foldably connected to the insert portion 54 along a tab fold line 56. The insert portion 54 is further provided with a crease line 58 to facilitate the positioning of the storage container 10 into the third position, as will be discussed in greater detail below.

Reference is now made to FIGS. 5, 6, 7 and 8 which illustrate the steps of forming the blank 20 into the second position of the storage container 10.

Figure 5:
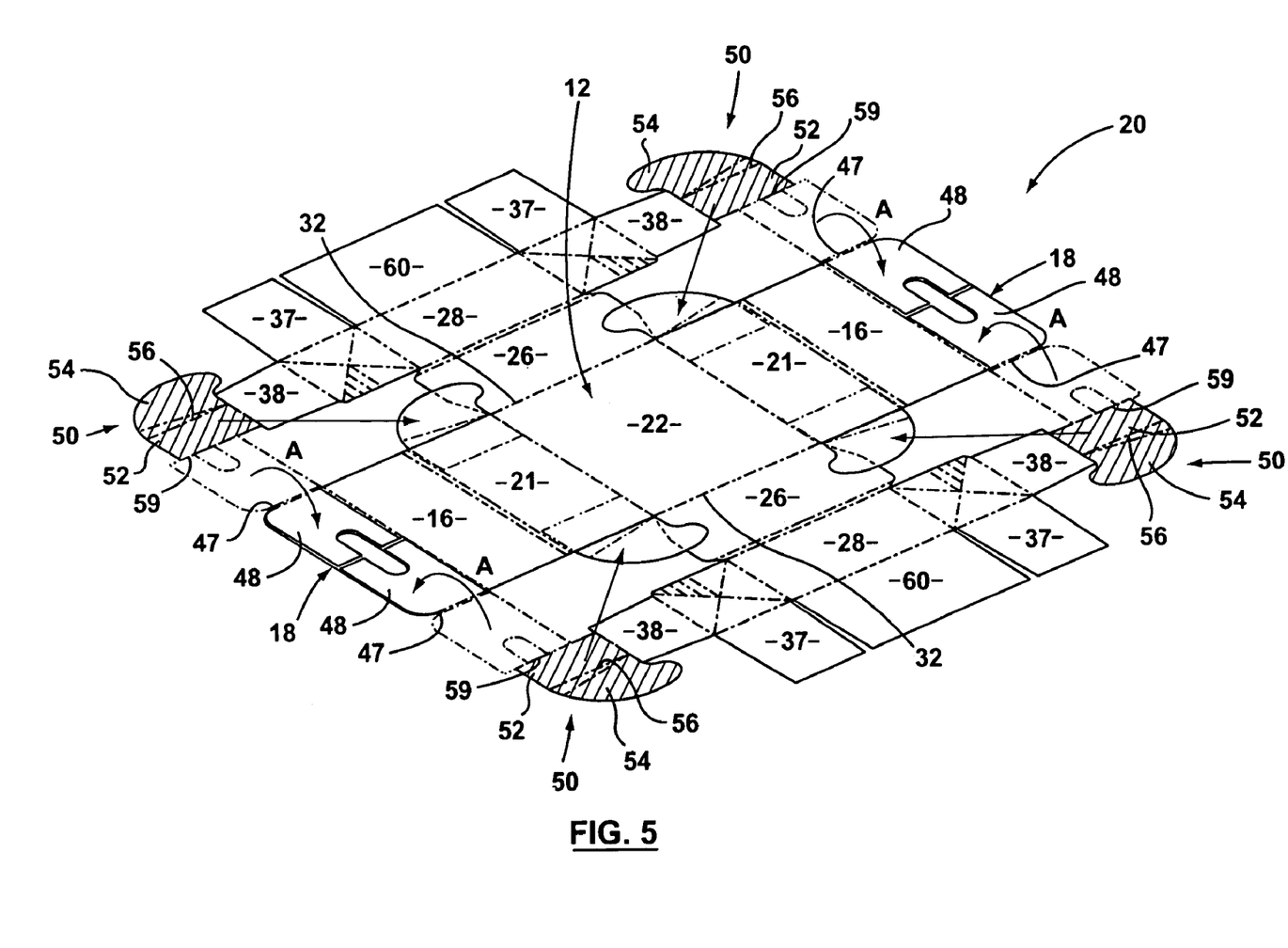
FIG. 5 is a perspective view of the blank illustrating a step A for forming the blank into the storage container.

FIG. 5 shows step A in the formation of the storage container 10. The handle panel 18 is formed by folding the reinforcing handle portions 48 about the handle edges 47 onto the main handle 46 (shown in FIG. 4). The reinforcing handle portions 48 may be secured to the main handle 46 using any suitable adhesive or fastener.

The four tabs 50, (shown shaded in FIG. 5), are detached from the blank 20 along a tear line 59. The attachment portions 52 of the tabs 50 are then adhered to the underside of each of the base panels 21 proximate to the four corners of the base 12. The insert portions 54 extend outwardly from the base panels 21. The tab fold line 56 is oriented generally parallel to the first side fold line 32.

Figure 6:
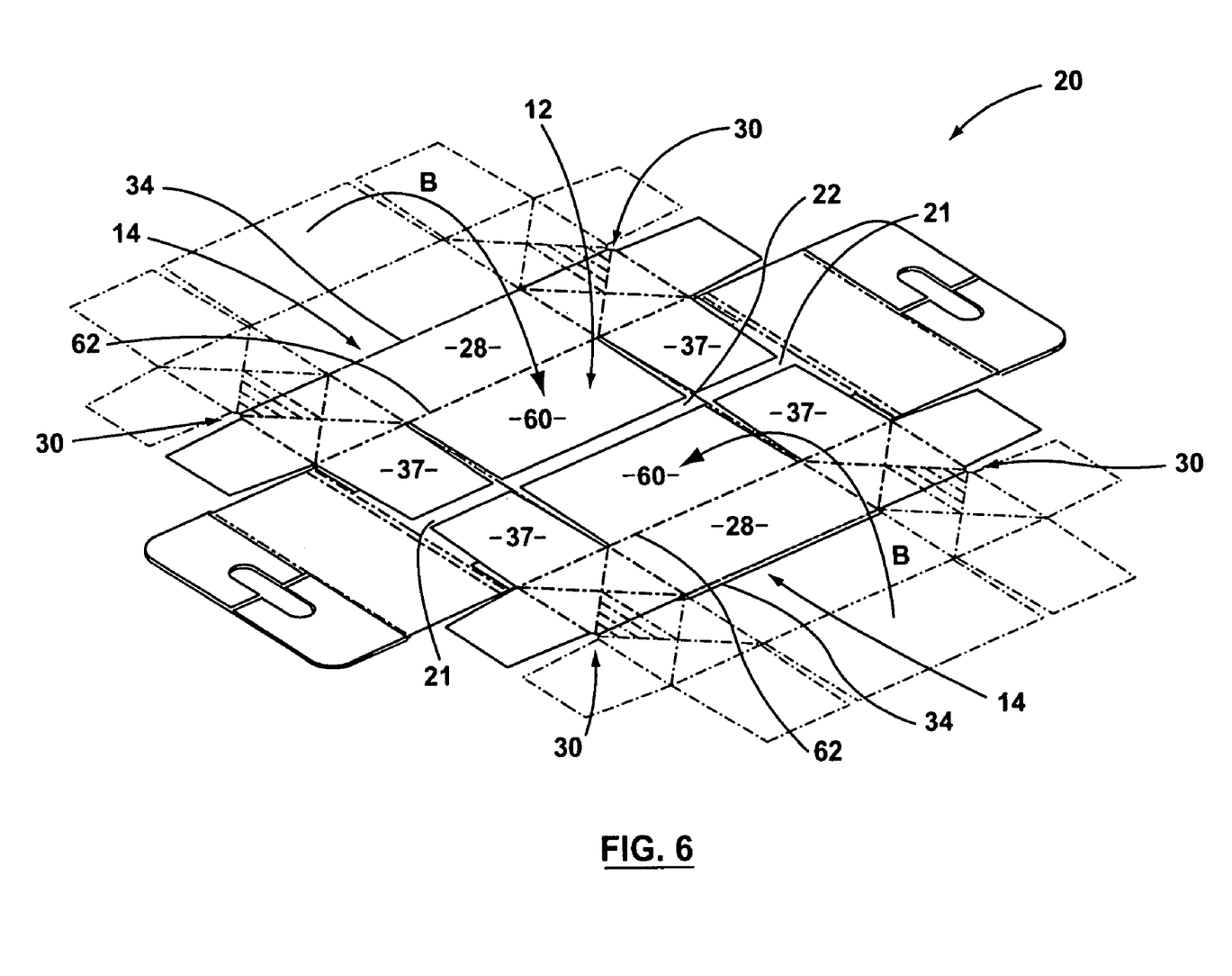
FIG. 6 is a perspective view of the blank illustrating a step B for forming the blank into the storage container.

Referring to FIG. 6, the side panels 14 are formed by hingedly folding the inner panels 28 about the double fold lines 34, as shown at step B. A pair of securement panels 60 foldably connected to the inner panels 28 along a pair of second side fold lines 62 are positioned on the upper side of the bottom portion 22 of the base 12. The base flaps 37 of the corner panel 30 are positioned on the upperside of the base panels 21. The securement panels 60 and base flaps 37 may be secured to the bottom portion 22 and base panels 21, respectively, using any suitable adhesive or fastener.

Figure 7:
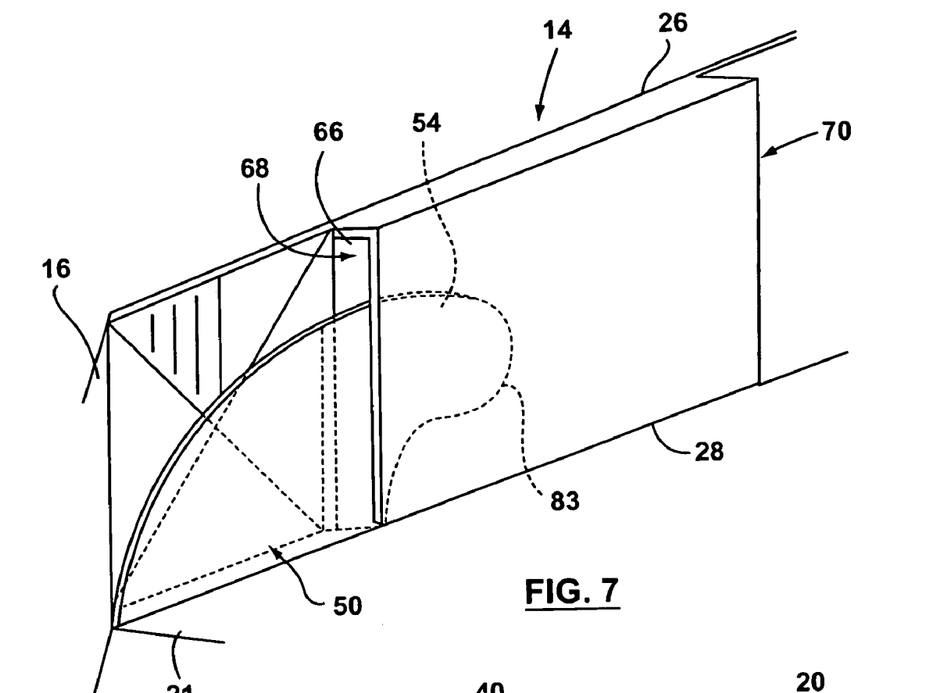
FIG. 7 is a partial perspective view of a channel formed by side panels of the storage container.

Referring to FIG. 7, a channel 66 is defined between the inner panel 28 to the outer panel 26 of each side panel 14. The insert portion 54 of the tabs 50 is received in the channels 66. Each of the channels 66 has a first end 68 and a second end 70 which are open. The first and second ends 68 and 70 of the channels 66 receive the corresponding tabs 50 adjacent thereto.

Figure 8:
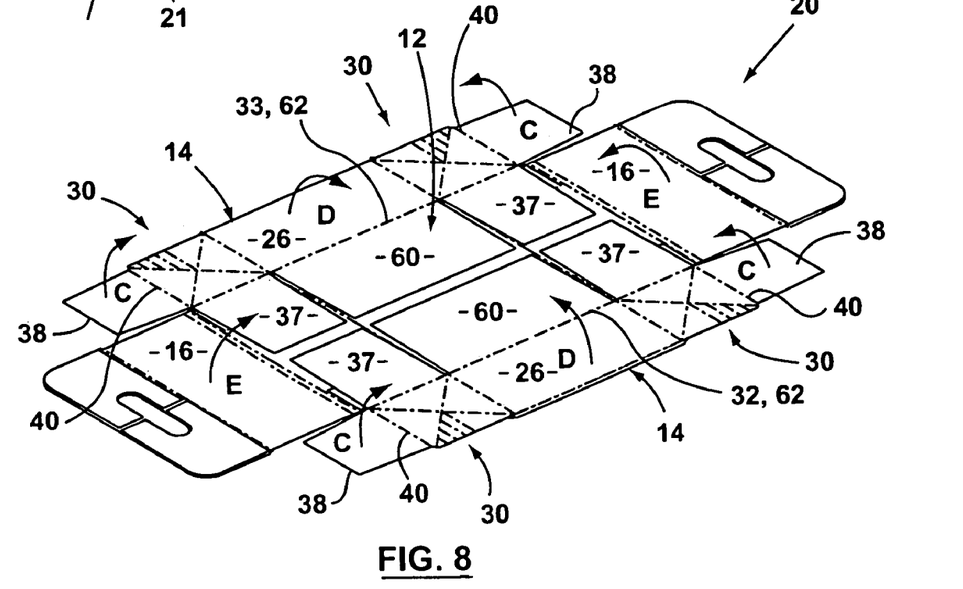
FIG. 8 is a perspective view of the blank illustrating steps C, D and E for forming the blank into the storage container.

Referring to FIG. 8, the side and end panels 14 and 16, respectively are folded generally perpendicular to the base 12 to form the second position of storage container 10 (shown in FIG. 2). At step C, the end flaps 38 of the corner panels 30 are folded generally perpendicular to the side panel 14 around the flap fold line 40. The side panels 14 are then folded generally perpendicular to the base 12 about the first and second side fold lines 32 and 62, as shown at step D. The end panels 16 may then be folded generally perpendicular to the base 12 to intersect the side panels 14 at a generally right angle in each of the corners and to form the open position in accordance with a preferred embodiment of the present invention. The end flaps 38 of corner panels 30 may be secured to the end panels 16 to stabilize the storage container 10 and to minimize leakage from the corner areas.

From the open position shown in FIG. 2, the storage container may be folded into either the generally planar position or the closed position.

Figure 9:
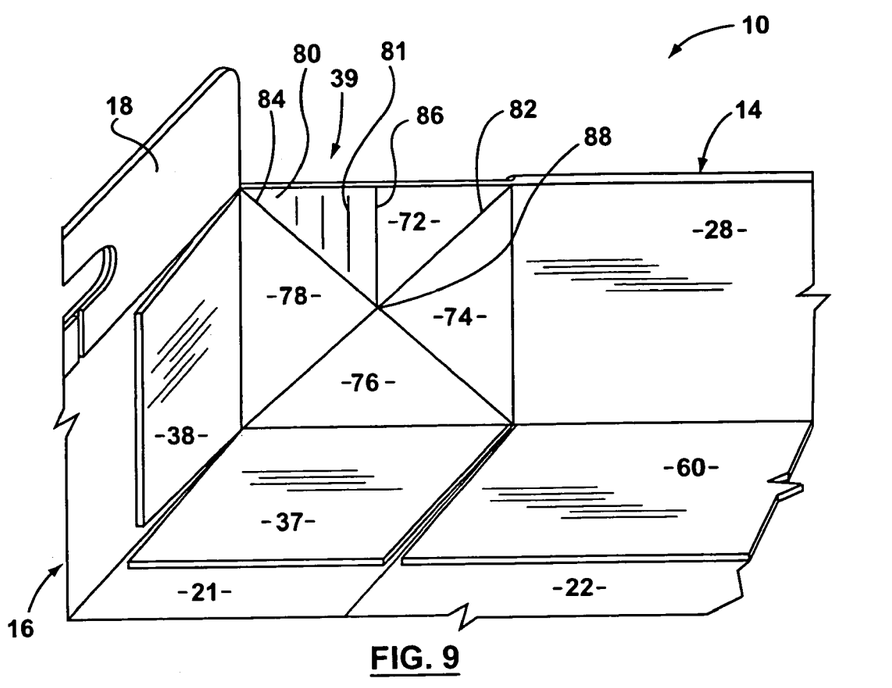
FIG. 9 is a partial perspective view of a corner panel of the storage container.

Referring to FIG. 9, the positioning of the storage container 10 into the first, second and third positions is achieved using the pivot panel 39. The pivot panel 39 preferably has a first sub panel 72, a second sub panel 74, a third sub panel 76, a fourth sub panel 78 and a fifth sub panel 80. The sub panels 72, 74, 76, 78 and 80 may be provided with score lines 81 to enable the sub panels 72, 74, 76, 78 and 80 to bow or bend as the storage container 10 is folded into the first, second and third positions.

The sub panels 72, 74, 76, 78 and 80 are foldably connected along one or more of a first crease line 82, a second crease line 84 and a bisecting crease line 86. The first and second crease lines 82 and 84 extend diagonally across the pivot panel 39 and intersect with the bisecting crease line 86 at a point 88 that is generally in the centre of the pivot panel 39. The lines 82, 84 and 86 are adapted to enable the sub panels 72, 74, 76, 78 and 80 to be folded relative to one another so as to allow the storage container 10 to be inwardly or outwardly closed upon itself into the first, second or third positions.

Figure 10:
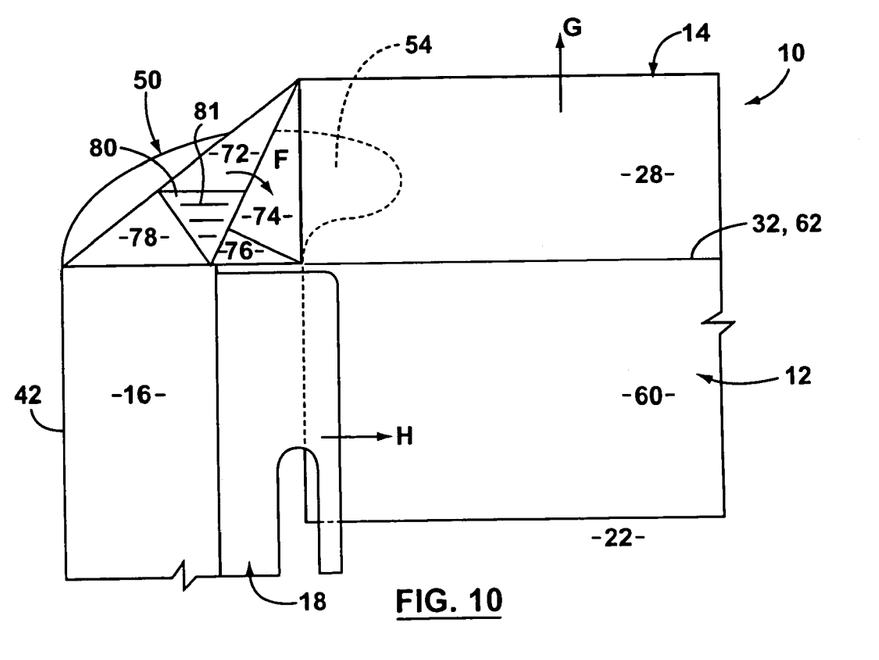
FIG. 10 is a partial top view of the corner panel illustrating steps F, G and H for forming the storage container into a generally planar position.

Reference is made to FIG. 10 which illustrates the positioning of the storage container from the open position (of FIG. 2) to the generally planar position of FIG. 1). At step F, the first, fourth and fifth sub panels 72, 78 and 80 are collapsed inwardly and downwardly about the first crease line 82 onto the underlying second and third sub panels 74 and 76. When fully collapsed, the first, fourth and fifth sub panels 72, 78 and 80 will be in an overlying relationship with the second and third sub panels 74 and 76. The inward movement of the first, fourth and fifth sub panels 72, 78 and 80 causes the side panels 14 to fold outwardly away from the base 12 about the first and second side fold lines 32 and 62, as shown at step G in FIG. 10. The insert portions 54 of the tabs 50 also fold outwardly about the tab fold lines 56 (not shown). The movement of the first, fourth and fifth sub panels 72, 78 and 80 further causes the end panels 16 to fold inwardly about the end fold lines 42 towards the base panels 21 (not shown in FIG. 10) of the base 12, as shown at step H. In this manner, the storage container 10 is folded into a generally planar shape suitable for stacking and shipping purposes.

Figure 11:
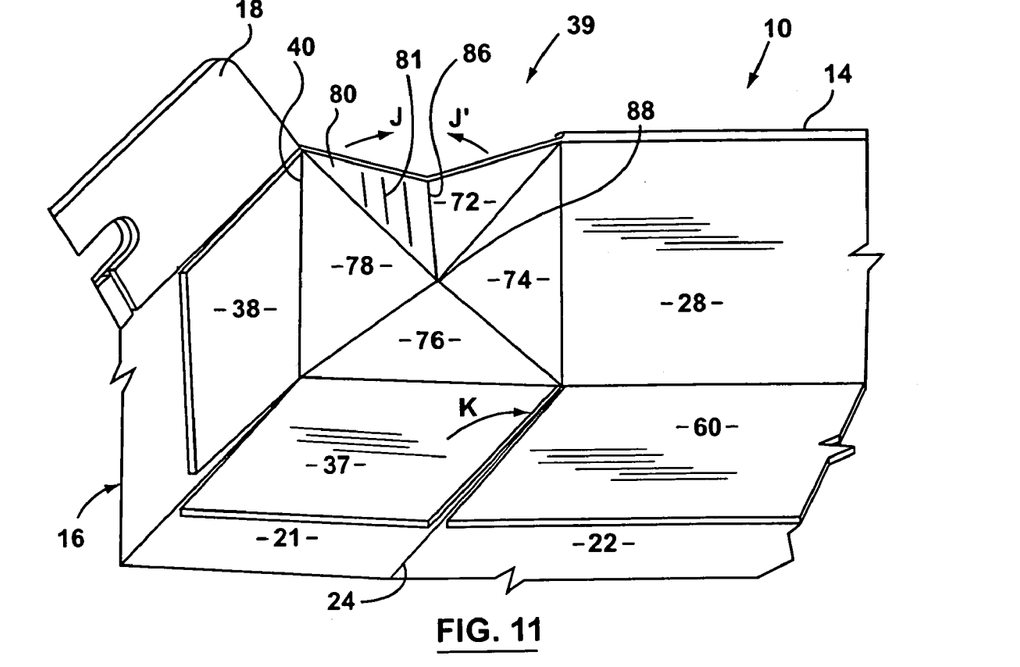
FIG. 11 is a partial perspective view of the corner panel illustrating steps J, J' and K for forming the storage container into a closed box position.
Figure 12:
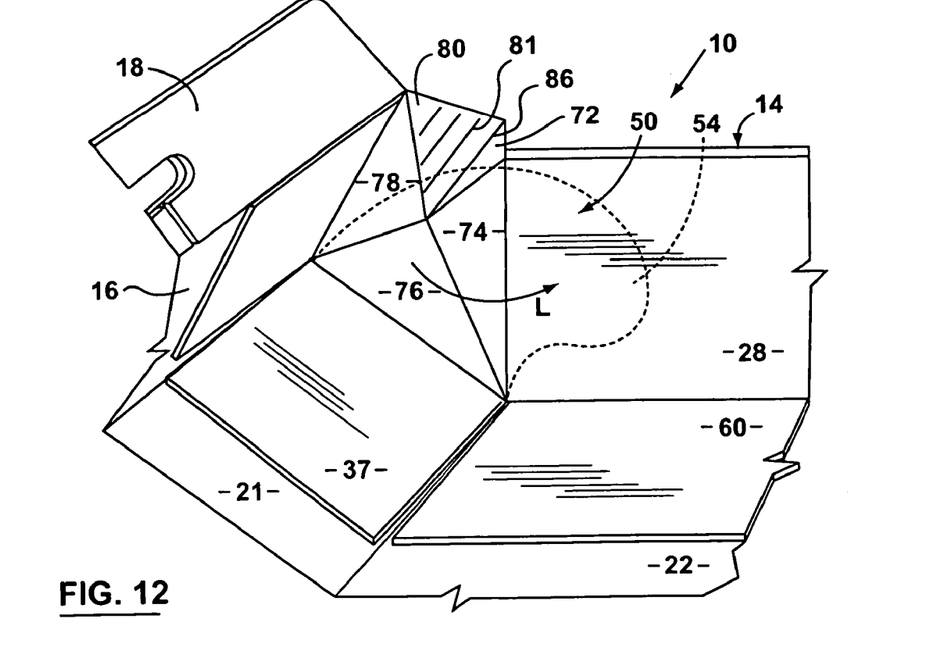
FIG. 12 is a partial perspective view of the corner panel illustrating a step L for forming the storage container into a closed box position.
Figure 13:
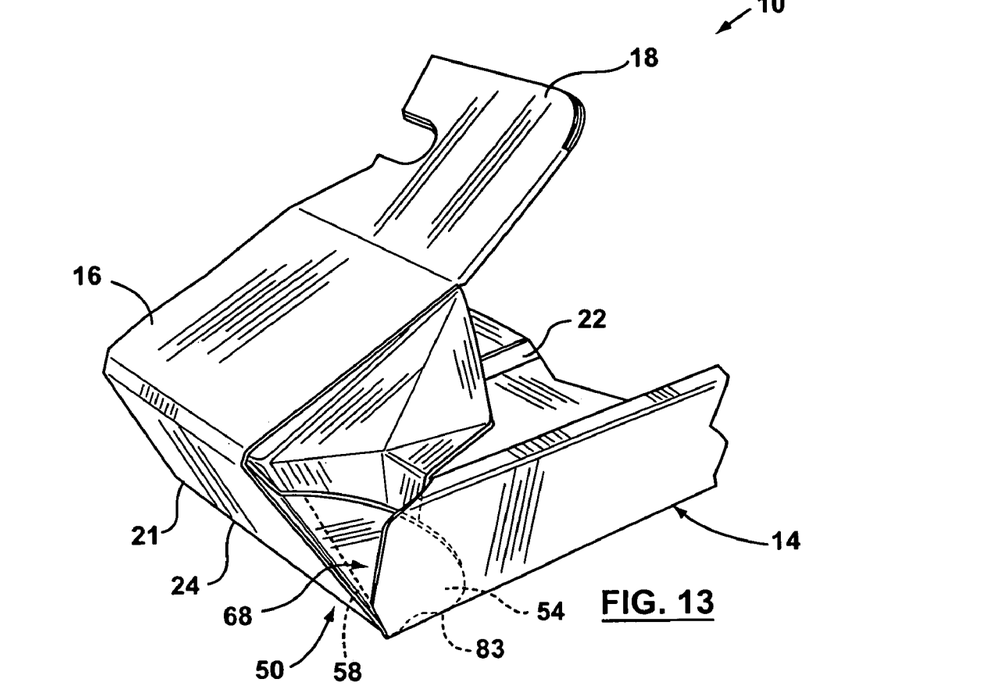
FIG. 13 is a partial perspective view of the storage container showing the channel receiving a tab.

Reference will now be made to FIGS. 11, 12 and 13 which show the steps of positioning the storage container from the open position to a closed position. Referring to FIG. 11, a point 88 is pressed inwardly causing the sub panels 72 and 80 to collapse in the directions J and J' around the bisecting line 86. The movement of the point 88 causes the sub panels 76 and 78 to fold inwardly about the flap fold lines 40. As the point 88 is pressed further inwardly, the base panels 21 rotate toward each other around the centre fold lines 24, as shown at step K.

Referring to FIG. 12, the sub panels 72 and 80 continue to collapse upon each other as bisecting line 86 and sub panel 80 together rotate around and beyond the sub panel 72, as shown at step L. The base panels 21 are now positioned generally perpendicular to the bottom portion 22. The end panels 16 are positioned generally parallel to and spaced apart from the bottom portion 22.

Once the storage container 10 has been folded into the closed position (shown in FIG. 3), the opposing handle panels 18 may be closed and clasped together to enable the storage container 10 to be carried. The handle panels 18 may be provided with interlocking or engaging notches (not shown) to help keep the panels clasped together. The notches may be formed in a V-shape defined by perforated edges provided on the blank 20. Any other suitable notch shape may be used to secure the handle panels.

As best shown in FIGS. 7 and 13, the movement of the end panels 16 and base panels 21 around the centre fold lines 24 (not shown) causes the insert portion 54 of the tab 50 to slide into the corresponding ends 68 and 70 of the channels 66. The insert portions 54 maintain the side panels 14 in a generally upright position relative to the bottom portion 22 as the end and base panels 16 and 21, respectively, are moved into the closed position. The insert portions 54 of the tabs 50 have a leading edge 83 which is designed to minimize resistance as the insert portion 54 is received into the channel 66. The leading edge 83 is also designed to contact the first and second fold lines 32 and 62 to prevent over rotation of the base panels 21 beyond the closed position.

The crease line 58 provided on the tab 50 enables the insert portion 54 to bow or bend as it received within the channel 66. The bowing or bending action maintains the leading edge of the insert portion 54 in alignment with the longitudinal axis of the channel 66. The insert portions 54 of the tabs 50 have a round contour which is designed to minimize resistance as the tab 54 is received into the channel 66.

Figure 14:
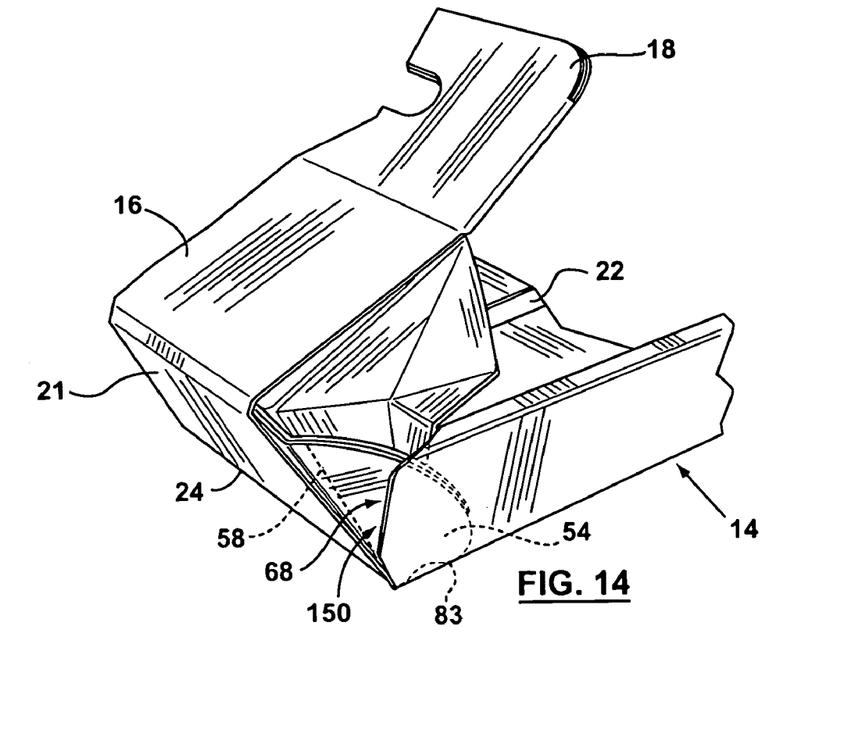
FIG. 14 is a partial perspective view of the storage container showing the channel receiving a tab of greater thickness in accordance with an alternate embodiment of the present invention.
Figure 15:
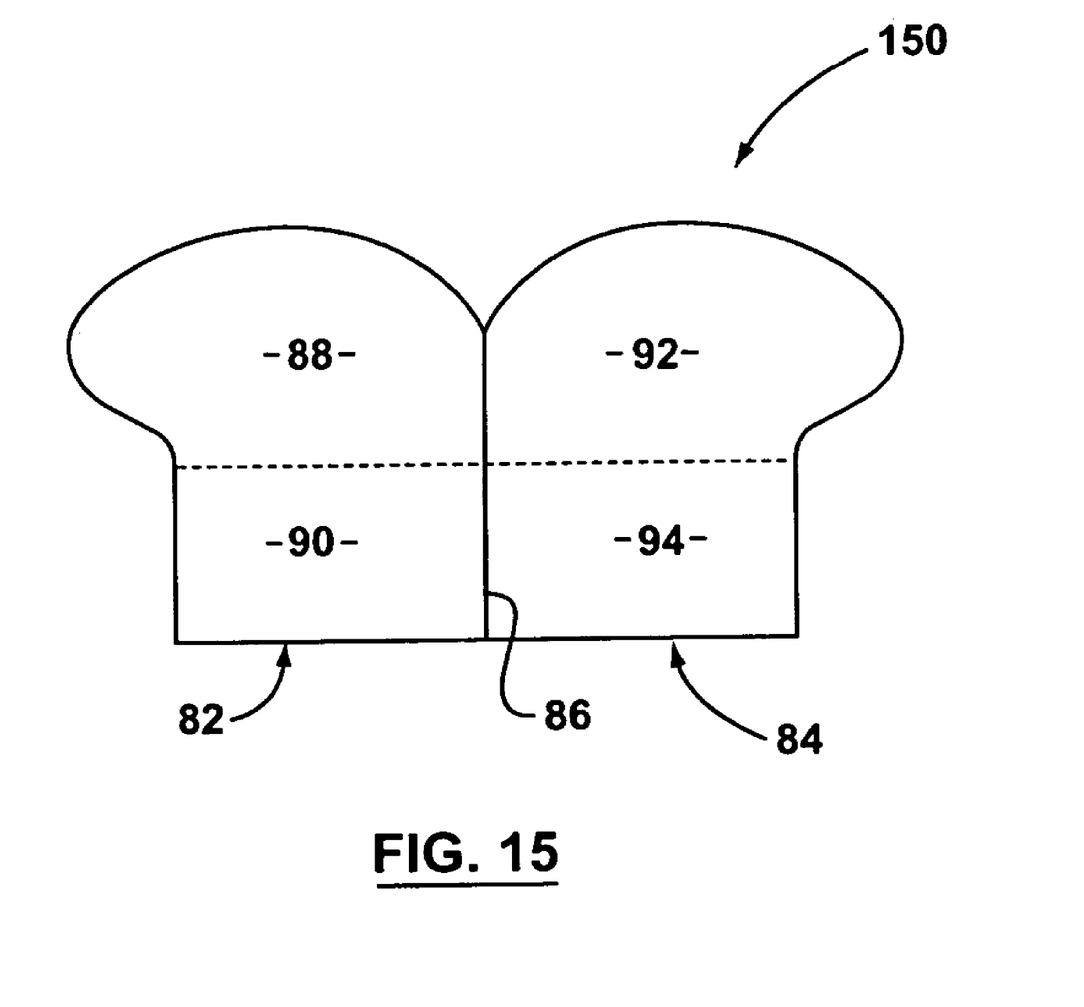
FIG. 15 is a plan view of the tab of FIG. 14.

Referring to FIG. 14, in an alternative embodiment, tabs 150 may be provided with increased thickness so as to provide greater support for the side panels 14. As shown in FIG. 15, the tabs 150 may comprise a first tab 82 and a second tab 84 foldably connected along a mirror line 86. The first tab 82 has a first insert portion 88 and a first attachment portion 90 which foldably mate with a second insert portion 92 and a second attachment portion 94 forming the second tab 84. The tabs 82 and 84 may be secured together using a suitable adhesive or fastener. It is understood that the mirror line 86 may be located along any edge of the tab 150 so as to permit the first tab 82 to foldably mate with the second tab 84.

The use and operation of the preferred embodiment will now be described with reference to FIGS. 16-18.

Figure 16:
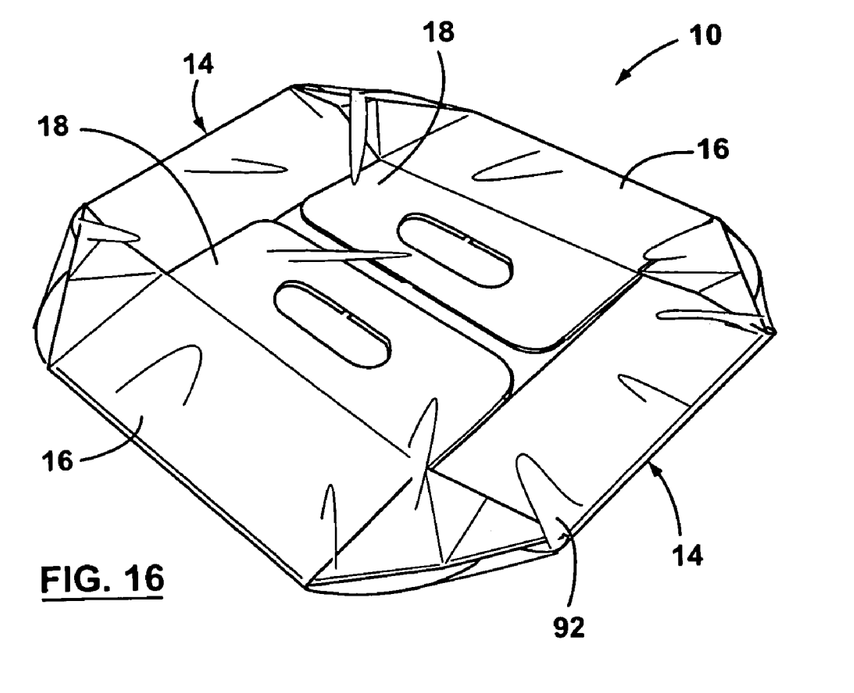
FIG. 16 is a perspective view of the storage container in a generally planar position storing a granular material and sealed with a plastic material.

Referring to FIGS. 1 and 16, the storage container 10 is folded into the first position as described above and sealed with a shrink wrap material 92 or any other suitable material for maintaining the storage container 10 in a generally planar shape. In this configuration, the storage container 10 assumes a generally planar shape that is suitable for shipping purposes and placing in a store display. Prior to use, the shrink wrap material 92 is removed from the storage container 10.

Figure 17:
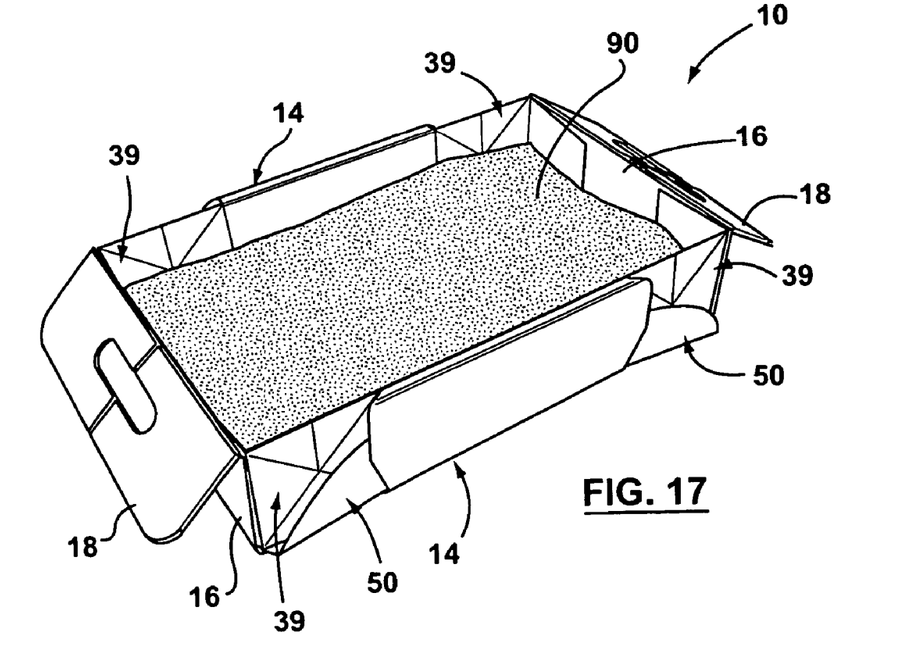
FIG. 17 is a perspective view of the storage container in an open container position storing the granular material.

Referring now to FIGS. 2 and 17, the side panels 14 are folded inwardly until being positioned generally perpendicular to the base 12. The end panels 16 are simultaneously folded outwardly so as to be generally perpendicular to the base 12, thereby forming the open position container. A layer of granular material 90 for cat lifter is dispersed across the base 12 of the storage container 10.

Figure 18:
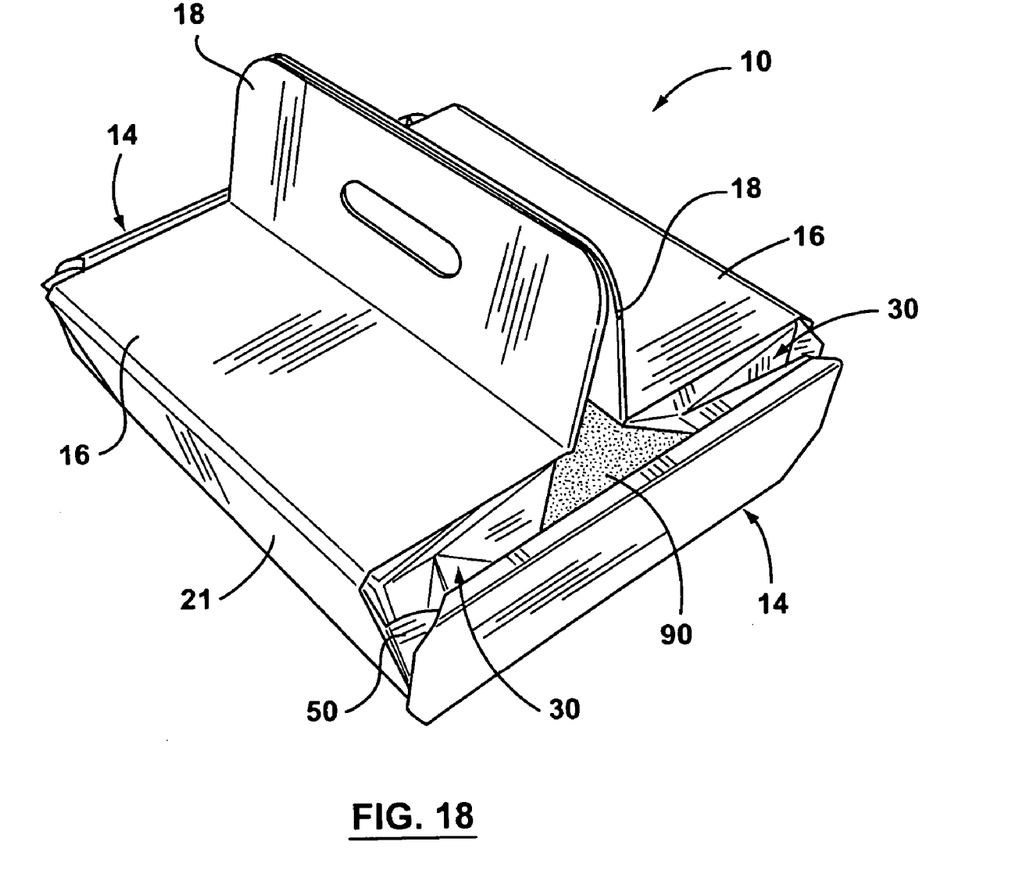
FIG. 18 is a perspective view of the storage container with the granular material in a closed box position.

Referring now to FIGS. 2 and 18, once the granular material 90 has been used, the storage container 10 is folded into the closed position (as described above) for disposal or storage purposes. The movement of the base panels 21 into a generally vertical position causes the granular material 90 to travel away from the collapsing corner panels 30 and to collect on and above the bottom portion 22. Accordingly, the full closure of the storage container 10 into the third position is not impeded by the presence of granular material 90 trapped adjacent to the corner panels 30, bottom portion 22, base panels 21 and/or side panels 14.

Referring to again FIGS. 7 and 14, the insert portions 54 of the tabs 50 slide in channels 66 to maintain the side panels 14 generally upright in relation to the bottom portion 22. This provides the advantage of reducing the likelihood of kitty litter 90 spilling out of the storage container 10 during folding thereof between the second (open container) and third (closed box) positions.

The handle panels 18 may then be pivoted into a generally vertical position and clasped together to enable the storage container 10 to be carried to the disposal or storage site.

While what has been shown and described herein constitutes a preferred embodiment of the subject invention, it should be understood that various modifications and adaptions of such embodiment can be made without departing from the present invention, the scope of which is defined in the appended claims.

The invention claimed is:

1. A storage container comprising:
   (a) a generally planar base, the base comprising a bottom portion and a pair of base panels foldably connected to the bottom portion, the bottom portion being located between each of the pair of base panels;
   (b) a pair of opposing end panels foldably connected to the base panels; and
   (c) a pair of opposing side panels foldably connected to the base panels and the end panels, wherein each of the pair of side panels defines a channel therein, the channel being adapted to slidably receive a first tab at a first end of the channel and a second tab at a second end of the channel, each of the first and second tabs being connected to each of the pair of base panels, wherein each side panel comprises an outer panel foldably connected to an inner panel, wherein the channel is defined between the inner and outer panels, wherein each side panel further comprises two corner panels, wherein each of the corner panels is foldably connected to the inner panel and to the end panel adjacent thereto;
   wherein the storage container is foldable between a first, a second, and a third position;
   wherein in the first position, the side panels and the end panels are folded to form a generally planar shape;
   wherein in the second position, the side panels and the end panels are folded generally perpendicular to the base to form an open container, and
   wherein in the third position, the base panels, side panels, and end panels are folded to form a closed box.

2. The storage container of claim 1, wherein the base has a rectangular shape.

3. The storage container of claim 2, wherein in said first position, the side panels are folded outwardly and the end panels are folded inwardly.

4. The storage container of claim 1, wherein each corner panel comprises a pivot panel with five sub panels.

5. The storage container of claim 4, wherein the sub panels are defined by three crease lines that intersect at a point.

6. The storage container of claim 5, wherein the crease lines comprise a first crease line, a second crease line and a bisecting crease line, the first and second crease lines extend generally diagonally across the pivot panel, and the bisecting crease line extends generally vertically from the point.

7. The storage container of claim 1, wherein when the storage container is in the second position the corner panels are in a generally upright position relative to the bottom portion.

8. The storage container of claim 6, wherein the sub panels collapse inwardly and downwardly about the first crease line when the storage container is positioned in the first position.

9. The storage container of claim 6, wherein when the storage container is in the third position the points are pressed inwardly and the sub panels are collapsed around the bisecting line, the sub panels are then collapsed about the first and second crease lines so that the base panel is positioned generally perpendicular to the bottom portion.

10. The storage container of claim 1, further comprising a pair of handle panels, each of the handle panels is foldably connected to each of the end panels.

11. A storage container comprising:
    (a) a generally planar base, the base comprising a bottom portion and a pair of base panels foldably connected to the bottom portion, the bottom portion being located between each of the pair of base panels;
    (b) a pair of opposing end panels foldably connected to the base panels; and
    (c) a pair of opposing side panels foldably connected to the base panels and the end panels, each of the pair of side panels defining a channel therein, wherein each side panel comprises an outer panel foldably connected to an inner panel, wherein the channel is defined between the inner and outer panels, wherein each side panel further comprises two corner panels, wherein each of the corner panels is foldably connected to the inner panel and to the end panel adjacent thereto;
    (d) a plurality of tabs connected to the base panels; wherein the channel slidably receives one of the plurality of tabs at each end of the channel, the plurality of tabs being adapted to position the side panels in a generally upright position when the end panels and base panels move between an open position and a closed position.

12. The storage container of claim 11, wherein the storage container is adapted to fold into a substantially planar position.

13. The storage container of claim 12, wherein when the storage container is in the substantially planar position the end panels are folded inwards towards the base and the side panels are generally folded outward away from the base.

14. The storage container of claim 11, wherein the base has a generally rectangular shape.

15. The storage container of claim 11, wherein each corner panel comprises a pivot panel with five sub panels.

16. The storage container of claim 15, wherein the sub panels are defined by three crease lines that intersect at a point.

17. The storage container of claim 16, wherein the crease lines comprise a first crease line, a second crease line and a bisecting crease line, the first and second crease lines extend generally diagonally across the pivot panel, and the bisecting crease line extends generally vertically from the point.

18. The storage container of claim 15, wherein when the storage container is in the open position the corner panels are in a generally upright position relative to the bottom portion.

19. The storage container of claim 11, wherein when the storage container is in the open position the end panels and the side panels are folded generally perpendicular to the base.

20. The storage container of claim 17, wherein the sub panels collapse inwardly and downwardly about the first crease line when the storage container is positioned in the substantially planar position.

21. The storage container of claim 17, wherein when the storage container is in the closed position the points are pressed inwardly and the sub panels are collapsed around the bisecting line, the sub panels are then collapsed about the first and second crease lines so that the base panels are positioned generally perpendicular to the bottom portion.

22. The storage container of claim 11, further comprising a pair of handle panels, each of the handle panels is foldably connected to each of the end panels.

23. The storage container of claim 1, wherein the storage container is formed from a blank.

24. The storage container of claim 23, wherein the blank is made from corrugated cardboard.

25. The storage container of claim 23, wherein the blank is made from non-corrugated cardboard.

26. The storage container of claim 22, wherein the storage container is made from plastic.

27. The storage container of claim 22, wherein the storage container is made from a multi-layered laminated material.

28. The storage container of claim 22, wherein the storage container is made from water resistant material.

29. The storage container of claim 22, wherein the storage container is made from anti-bacterial material.

30. The storage container of claim 11, wherein the storage container is formed from a blank.

31. The storage container of claim 30, wherein the blank is made from corrugated cardboard.

32. The storage container of claim 31, wherein the blank is made from non-corrugated cardboard.

* * * * *

UNITED STATES PATENT AND TRADEMARK OFFICE
CERTIFICATE OF CORRECTION

PATENT NO. : 7,255,261 B2 Page 1 of 1
APPLICATION NO. : 10/774474
DATED : August 14, 2007
INVENTOR(S) : Olivier Denys André Mesly It is certified that error appears in the above-identified patent and that said Letters Patent is hereby corrected as shown below:

Column 10, in Claim 32:
Line 10, "31" should be -- 30 --.

Signed and Sealed this

Twelfth Day of August, 2008

JON W. DUDAS
*Director of the United States Patent and Trademark Office*